United States Patent [19]

Ricci

[11] 4,162,533
[45] Jul. 24, 1979

[54] TIME COMPRESSION CORRELATOR

[75] Inventor: David P. Ricci, Upper Marlboro, Md.

[73] Assignee: The United States of America as represented by the Secretary of the Navy, Washington, D.C.

[21] Appl. No.: 873,324

[22] Filed: Jan. 30, 1978

[51] Int. Cl.² ............................................. G06F 15/34
[52] U.S. Cl. ..................................... 364/728; 364/604
[58] Field of Search ............... 364/517, 604, 728, 819; 393/100 CL; 340/146.2

[56] References Cited

U.S. PATENT DOCUMENTS

| 3,371,197 | 2/1968 | Munson | 364/728 |
| 3,373,359 | 3/1968 | Pryor, Jr. et al. | 364/604 |
| 3,521,044 | 7/1970 | Costas | 364/819 |
| 3,750,152 | 7/1973 | Waful | 364/517 |
| 3,777,133 | 12/1973 | Beck et al. | 364/728 |
| 3,878,381 | 4/1975 | Broder et al. | 364/728 |
| 4,071,903 | 1/1978 | Head et al. | 364/728 |

Primary Examiner—Felix D. Gruber
Attorney, Agent, or Firm—R. S. Sciascia; A. L. Branning; G. J. Perry

[57] ABSTRACT

A shift register time compression correlator for determining the degree of coincidence between two signals designed specifically for battery power or other power limited applications. The correlator introduces variable delays to one input signal and compares the delayed input signal with the other input signal which remains undelayed. The output is a stream of digital pulses, the density of which is a measure of the degree of coincidence between the two input signals.

6 Claims, 5 Drawing Figures

| SYMBOL | TIMING WAVEFORM | PULSE WIDTH | WAVEFORM PERIOD |
|---|---|---|---|
| $f_c$ | CLOCK | $1/f_c$ | $1/f_c$ |
| S | SAMPLE PULSE | $1/f_c$ | $N \times 1/f_c$ |
| $\bar{S}$ | INVERTED SAMPLE PULSE | $1/f_c$ | $N \times 1/f_c$ |
| T | | $N/f_c$ | $N \times (N \times 1/f_c)$ |
| $\bar{T}$ | | $N/f_c$ | $N \times (N \times 1/f_c)$ |

FIG. 4

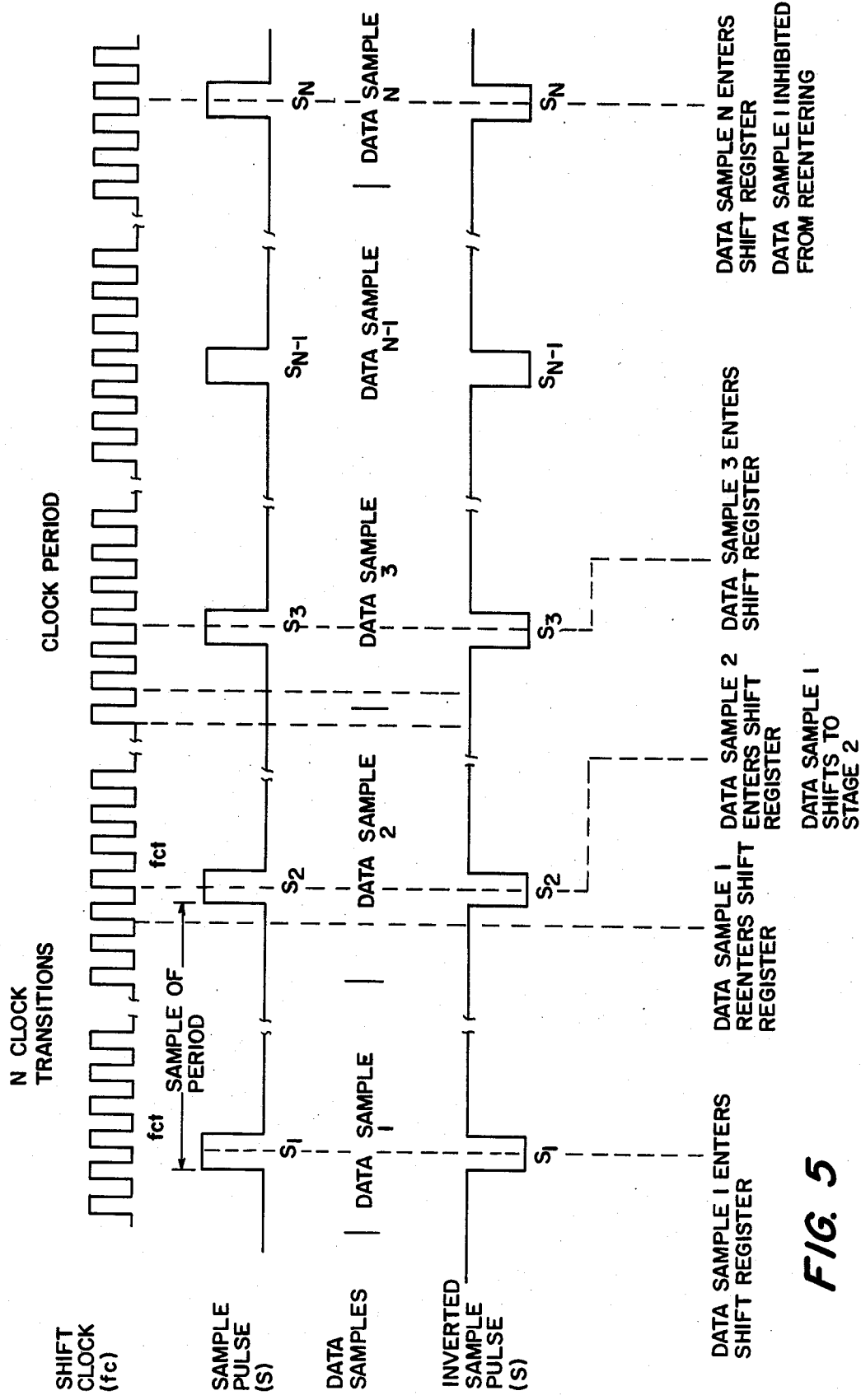

TIME COMPRESSION CORRELATOR

BACKGROUND

This invention relates to correlators for determining the degree of coincidence between two signals. More particularly this invention relates to digital time compression correlators and even more specifically to time compression correlators which determine the degree of coincidence between two signals as a function of a time delay introduced between them by causing one of the signals to be subjected to an indexed timed delay while comparing it to the other signal.

Time compression correlators using shift registers as the delay device have had the general design illustrated in FIG. 1. The three registers are designated Moving Time Series 1 (MTS 1), Moving Time Series 2 (MTS 2), and Stationary Time Series (STS). Two registers, MTS 1 and MTS 2, accumulate consecutive data samples of two waveforms and generate high-frequency replicas of these waveforms. The STS accepts the output of MTS 2 and generates a high-frequency replica of these data. The STS operation differs from MTS operation in that the MTS accumulates one data sample and drops one previously accumulated data sample during each sample period. In the STS, all data are replaced in the shift registers during one sample period. The coincidence logic compares the output of the STS and MTS 1 to generate an output corresponding to the degree of correlation between the inputs of MTS 1 and MTS 2. For this circuit, data are sampled at fs Hz, and the data in each register shift at N times fs Hz, where N is the length of the stationary time series.

Generally, ordnance systems dictate the shift register length and sample frequency. Since these parameters determine the clock frequency, power dissipation cannot be reduced by restricting the highest allowable clock frequency without some information loss. When an application requires large shift registers, the clock frequency, and thus power dissipation, increases significantly making this design impractical for battery operation for long periods.

SUMMARY OF THE INVENTION

Accordingly, the present invention provides a time compression correlator using shift registers as the time delay medium employing a gated clock accumulator (GCA) in place of a conventional moving time series. Data transfers occur in the GCA at a lower average frequency than it does in a moving time series and the power dissipation for a C-MOS shift register employed in both a moving time series and a GCA is proportional to the data shift rate. By using the GCA circuit power is conserved.

The correlator, according to the present invention, determines the degree of coincidence between two clipped analog input signals as a function of a variable time delay between them.

One of the two input signals is gated into a moving time series employing a recirculating C-MOS shift register. This moving time series accumulates N−1 consecutive data samples and presents at its output during each sample period a high frequency N-bit replica of the accumulated data. The Moving Time Series is wired in recirculating fashion such that, once filled with data, each new data bit entering replaces the oldest data stored.

The second clipped analog input signal is coupled to the input of the GCA, which accumulates N−1 consecutive data samples and presents at its output an N-bit replica of the accumulated data. The GCA does not constantly replace the oldest data bit as does the MTS, but rather fills completely with data, displays all of this data, and then refills with new data samples.

The output of the GCA is coupled to a Stationary Time Series (STS) which presents at its output a high frequency (time compressed) replica of the data stored and presented to it by the GCA.

Coincidence logic compares bit for bit the outputs of the MTS and STS and produces a stream of pulses, the density of which is proportional to the correlation between the two clipped analog signals.

OBJECTS OF THE INVENTION

It is therefore an object of the present invention to produce a time compression correlator using C-MOS shift registers.

Another object of the present invention is to produce a time compression correlator having minimal power drain.

A further object of the present invention is to produce a time compression correlator that minimizes the average data shift frequency in its shift registers.

BRIEF DESCRIPTION OF THE DRAWINGS

Other objects and many of the attendant advantages of the present invention will be readily apparent as the invention becomes better understood by reference to the following detailed description with the appended claims, when considered in conjunction with the accompanying drawings, wherein:

FIG. 4 is a chart detailing and comparing the pulse width and periods of various timing waveforms used in the time compression correlator according to the present invention.

FIG. 5 is a timing diagram for moving time series 20.

DETAILED DESCRIPTIONS OF THE PREFERRED EMBODIMENTS

GENERAL DESCRIPTION

Figure 2:
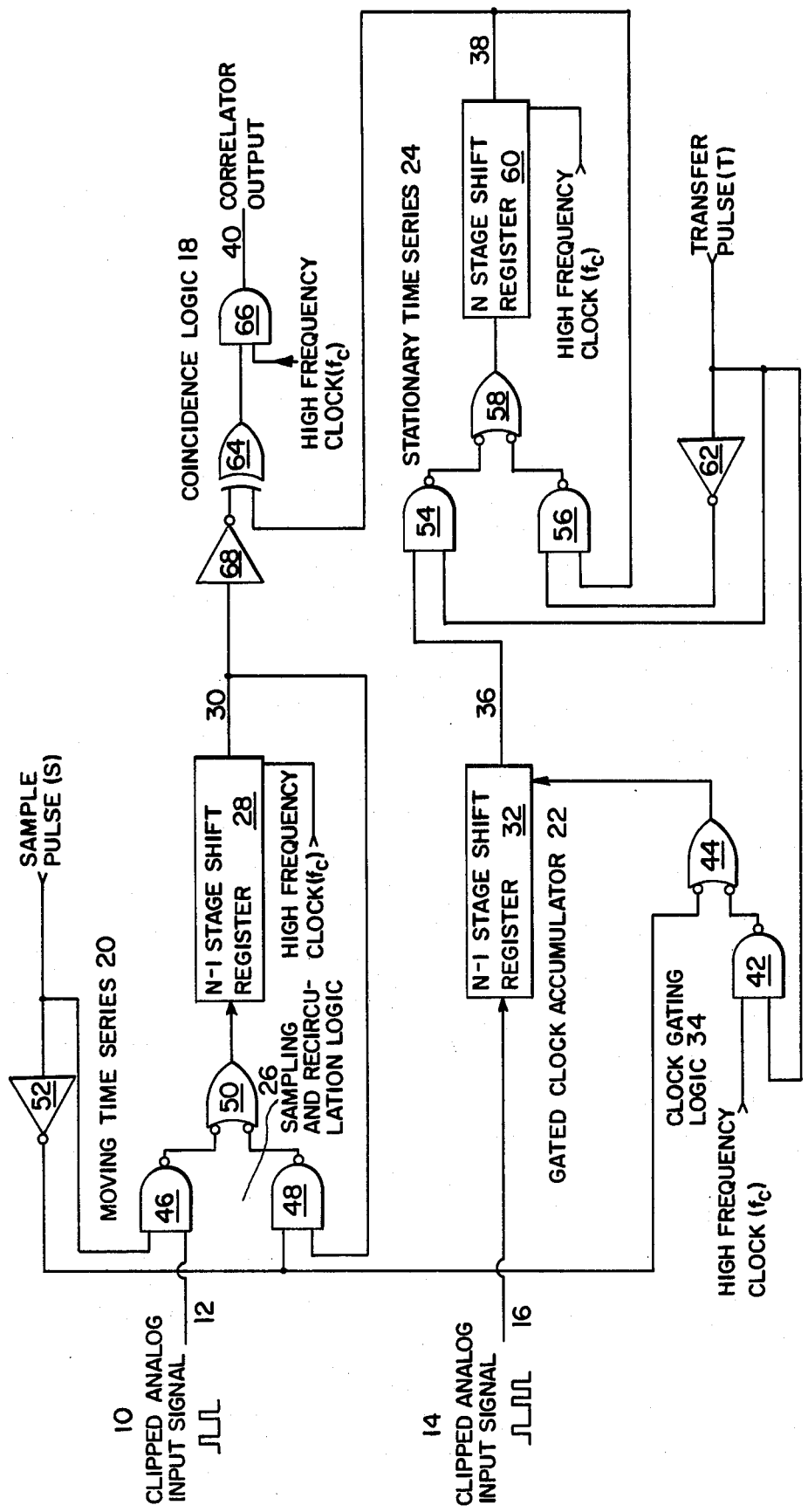
FIG. 2 is a schematic diagram of the time compression correlator according to the present invention.

Referring now to FIG. 2, the time compression correlator determines the degree of coincidence between a first clipped analog input signal 10 appearing on a first input data line 12 and a second clipped analog input signal 14 appearing on a second input data line 16. This coincidence is determined as a function of a variable time delay between these two input signals. Means are provided to index the time delay at discrete levels and to measure, using coincidence logic 18, the degree of correlation between signals 10 and 14 for each such indexing.

The indexing of time delay occurs as a result of the manner of data storage and retrieval in the main functional areas of the correlator—a moving time series 20, a gated clock accumulator 22, and a stationary time series 24.

Clipped analog input signals 10 and 14 are sampled during sampling period S to form groups of discrete (digital level) samples $DS_1 \ldots DS_n$. Analog input signal 10 is coupled through sampling and recirculation logic 26 to the heart of the Moving Time Series 20 which is a Moving Time Series shift register having $N-1$ stages, one less than the number of discrete data samples in each group of N such samples. The function of this Moving Time Series shift register 28 is to accumulate $N-1$ consecutive data samples, $DS_1 \ldots DS_{n-1}$ and to present at its output 30 during each sample period S, a high frequency N-bit replica of the accumulated data. Moving Time Series register 28 is wired in recirculating fashion so that each data sample DS that enters the register replaces the oldest sample in the register. In effect, the information in register 28 is a discrete picture of input signal 10 shifted in time intervals through a "window" or "gate" that is fixed, a shift occurring during each sample pulse S.

Second analog input signal 14 is coupled to the input of gated clock accumulator 22 and is stored in its gated clock accumulator shift register 32 under direction of clock gating logic 34. Gated clock accumulator 22 and its register 32 accumulate $N-1$ consecutive data samples $DS_1 \ldots DS_{n-1}$ and present at its output 36 during every Nth sample period a high frequency N-bit replica of the accumulated data.

The output 36 of gated clock accumulator 22 is coupled to a stationary time series 24. Stationary time series 24 presents at its output 38 during each sample period a high frequency replica of the data stored by the gated clock accumulator. The data in stationary time series 24 are therefore unaltered for N sample periods.

Coincidence logic 18 compares each output bit of moving time series 20 with each output bit of stationary time series 24 and produces a stream of pulses at its output 40, the pulse density of which is a measure of the correlation of input signals 10 and 14. Maximum correlation is indicated by N comparison pulses during a sample period, minimum correlation is indicated by the absence of any output coincidence pulses, and N/2 coincidence pulses during a sample period corresponds to 50 percent correlation. Other pulse densities are representative of corresponding correlation values.

Figure 3:
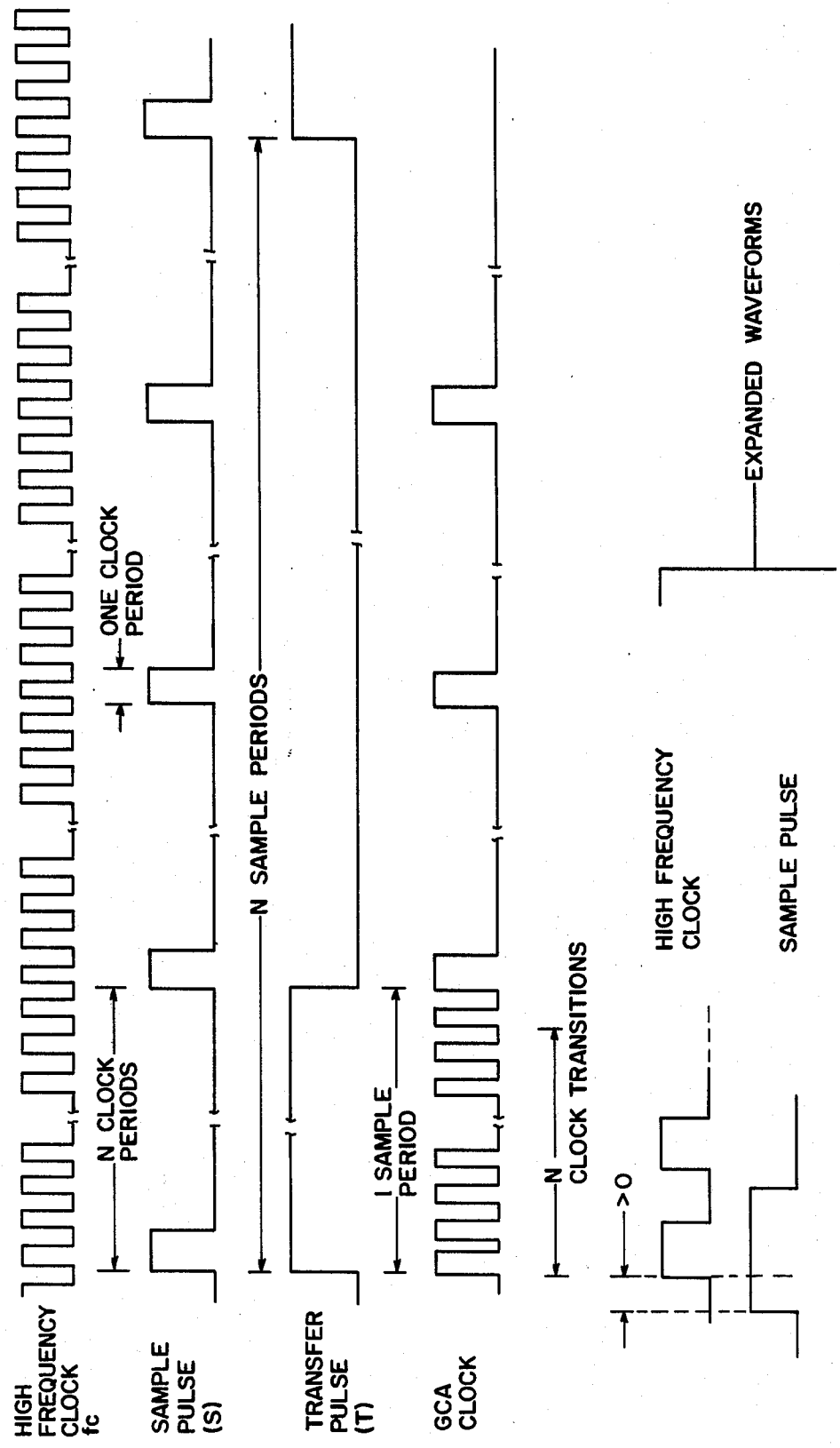
FIG. 3 is a graphical representation of the timing waveforms used in the time compression correlator according to the present invention.

The operational details will be better understood with continued reference to FIG. 2 along with FIG. 3, the overall timing waveforms FIG. 4, the chart of pulse width and waveform periods comparing the various shifting and timing pulses, and FIG. 5, the timing diagram for moving time series 20.

TIMING DEFINITIONS AND RELATIONSHIPS

FIGS. 3 and 4 illustrate the timing definitions and relationships for N - point time compression correlation as follows:

fc: High-frequency clock. A periodic function having frequency fc and period 1/fc.

fs: Sample frequency clock. A periodic function having frequency fs where fs=fc/N. The period is 1/fs=N/fc.

S: Sample pulse. A periodic function which is logic 1 for 1 high-frequency clock period, logic 0 for $N-1$ high-frequency clock periods.

T: Transfer pulse. A periodic function which is logic 1 for 1 sample frequency clock period, logic 0 for $N-1$ sample periods. Alternatively, T is logic 1 for N high-frequency clock periods.

$\overline{S}$ Logical complement of S.

$\overline{T}$ Logical complement of T.

GATED CLOCK ACCUMULATOR

The function of the gated clock accumulator 22 is to accumulate $N-1$ consecutive data samples and present at its output 36 during every Nth sample period a high-frequency N-bit replica of accumulated data.

Accumulator 22 includes a $N-1$ stage C-MOS shift register 32 and clock gating logic 34 which uses two gates 42 and 44 to select the shift clock for register 32. Accumulator 22 is not a recirculating shift register.

High frequency clock fc and transfer pulse T serve as the two inputs to gate 42. The output of gate 42 is coupled to one of the inputs of gate 44. The other input of gate 44 is $\overline{S}$ (generated for and obtained from moving time series 20). Second clipped analog input signal on data line 16 is coupled to the data input of register 32, and gates 42 and 44, combining fc with $\overline{S}$, determine the shift times for register 32.

Gate 44 allows a sample pulse S to shift data in register 32 when transfer pulse T is at a logic "1," and the combination of gates 42 and 44 allows the high frequency clock fc to shift data in register 32 only when transfer pulse T is at logic "1." T and $\overline{T}$ cannot be at logic "1" simultaneously, so either a sample pulse S or the high frequency clock fc can shift data, but not concurrently.

New data enters register 32 on transitions of the sample pulse S waveform. Data already in register 32 are simultaneously shifted by this signal.

After $N-1$ sample pulse transitions, GCA register 32 has accumulated $N-1$ consecutive data samples. Clock logic 34 inhibits the sample pulses S and allows the high frequency clock fc to shift data out of the GCA 22 for one sample period. All data stored in the register 32 plus data sample N appear on the output 36 of the GCA 22 only during this one sample period. After outputing all GCA 22 stored data, clock gating logic 34 allows the sample pulses S to input new data.

In summary, new data enter GCA 22 on the transition of sample pulses S. Data accumulated in GCA 22 are shifted out of the GCA by the high-frequency clock fc during one sample period and the data shifted out of GCA 22 are a high-frequency replica of N previously sampled data.

MOVING TIME SERIES 20

Moving time series 20 includes an $N-1$ stage C-MOS shift register 28 wired for recirculation through sampling and recirculation logic 26 comprising three gates 46, 48, 50. Input data line 12 and the sample pulses source serve as the two inputs to gate 46. A first inverter 52 couples sampling pulses S to one of the inputs to gate 48, thereby causing the complement of S, $\overline{S}$, to appear at that input. The second input to gate 48 is the recirculation line from the output 30 of register 28. The outputs of gates 46 and 48 serve as the two inputs of gate 50, the output of which serves as the data input to register 28.

Wired in this fashion, gates 46 and 48 allow new data to appear at the input of register 28 only when a sample pulse S is present. Gates 48 and 50 allow the output 30 of register 28 to appear at the input of register 28 only when the complemented sample pulse $\overline{S}$ is present. The time between sample pulses S is the sample period. Since S and $\overline{S}$ cannot be at logic "1" simultaneously, new data may appear at the input to register 28 or the output 30 of register 28 may appear at its input, but both inputs cannot appear concurrently.

Referring to FIG. 5, the moving time series timing diagram, data are entered and shifted through register 28 on the transitions of the high-frequency clock fc. There are N clock transitions during each sample period. During sample pulse $S_1$, the first data is gated by S onto the input of register 28. On the transition of high frequency clock fc, data sample 1 is entered onto stage 1 of register 28 and is shifted N times by high frequency clock fc before the second data sample is gated onto the input of register 28 during the second sample pulse $S_2$. Since register 28 is N−1 stages and since the output 30 of register 28 is gated back to its input during $\bar{S}$ pulses, the first data sample will reenter stage 1 of register 28 prior to the occurrence of the second sample pulse $S_2$. On the clock transition during $S_2$, the first data sample is shifted to stage 2 of register 28 and the second data sample enters stage 1.

After N additional clock transitions, the second data sample will be in stage 1 while the first data smaple will be in stage 2 of register 28. At the clock transition during $S_3$, the first data sample will be shifted into stage 3, the second data sample will be shifted into stage 2 and the third data sample will enter stage 1. This process continues and after N−1 sample pulses, the first data sample occupies stage N−1 of register 28, the second data sample occupies stage N−2, and so on with the data sample N−1 occupying stage 1. During the Nth data sample, this sample enters stage 1 of register 28 and the first data sample is inhibited from reentering by sampling and recirculation logic 26 and is no longer stored. Thus, during each sample pulse, one new data sample is added to moving time series 20 and simultaneously, one data sample previously stored is no longer stored.

In summary, new data enters moving time series 20 only during a clock transition of fc when a sample pulse S is present and only one data sample is accumulated during each sample period. Data stored in moving time series 20 is reentered into it by the complemented sample pulse, $\bar{S}$ on the transitions of fc. One stored data sample is dropped during each sample period. Each data sample is stored in an N−1 stage shift register 28 for N sample periods and every data sample stored in moving time series 20 appears at its output 30 once during each sample period. Finally, in accordance with the overall purpose of moving time series 20, the data at its output 30 is an N-bit high-frequency replica of the N previous samples.

Note that there are important differences between gated clock accumulator 22 sampling clipped analog data signal 14 and moving time series 20 sampling clipped analog data signal 10. Moving time series 20 always shifts data at the high-frequency clock rate fc. Gated clock accumulator 22, on the other hand, shifts data at the high-frequency clock rate only during the transfer period; and all other times, data are shifted by sample pulses S. All data accumulated in moving time series 20 appear at its output 30 during every sample period. But, data accumulated in GCA 22 appear at its output 36 only when a transfer pulse (T) is present. This difference in operations naturally follows from MTS 20 using a recirculating shift register arrangement while GCA 22 does not.

The significant similarity in the function of MTS 20 and GCA 22 is that the output of each is a time compressed replica of N previously accumulated, consecutive data samples when the transfer pulse T is present.

STATIONARY TIME SERIES 24

Stationary time series (STS) 24 having an output 38 includes three gates 54, 56, 58 and an N-stage C-MOS shift register 60. Gate 54 receives the output 36 of GCA 22 at one of its two input ports and transfer pulses T at its other input. Gate 56 receives the complement of transfer pulses, $\bar{T}$, at one of its two inputs from a second inverter 62 coupled between the transfer pulse line and that input port. Its second input is coupled to the output 38 of STS 24 (also the output of STS shift register 60). The two inputs to gate 58 are coupled to the outputs of gates 54 and 56. The output of gate 58 is coupled to and serves as the data input for STS shift register 60.

Connected in this fashion, gates 54 and 58 allow new data to appear at the input of register 60 only when a transfer pulse T is present. Gates 56 and 58 allow the output 38 of register 60 to appear at its input only when the complemented transfer pulse $\bar{T}$ is present. Second inverter 62 complements transfer pulses T and there are N sample periods between transfer pulses T. Since T and $\bar{T}$ cannot be at logic "1" simultaneously, new data may appear at the input to register 60 or the output 38 of register 60 can appear at its input, but they may not appear concurrently. Data are entered and shifted through register 60 only on the transitions of clock pulses fc.

During transfer pulse T, time compressed data samples 1 through N are gated from the output 36 of the GCA 22 onto STS shift register 60 on transitions of fc. These data are gated back into shift register 60 by the complemented transfer pulse $\bar{T}$. Data samples in STS 24 are not individually dropped or added as in MTS 20. Rather, data samples in STS 24 are stored for N sample periods. After N sample periods, all data samples in STS 24 are replaced by the entire contents of GCA 32.

In summary, new data enters STS 24 only on the transitions of a clock pulse fc during a transfer pulse T. Data stored in STS 24 are reentered into the STS by the complemented transfer pulse $\bar{T}$ on transitions of the high frequency clock fc. N bits of data are entered into STS 24 during one sample period of every N sample periods, and every data sample stored in STS 24 appears on its output 38 during each sample period.

COINCIDENCE LOGIC 18

Coincidence logic 18 includes two C-MOS gates 64, 66 and a coincidence inverter 68. Inverter 68 couples MTS output 30 to one of two input ports of gate 64. STS output 38 serves as the second input to gate 64. The output of gate 64 is coupled to one of the two inputs to gate 66. The second input to gate 64 is coupled to the high frequency clock fc. The output 40 of gate 66 is the correlator output.

CORRELATION

The purpose of the time compression correlator is to determine the degree of coincidence between two waveforms as a function of the delay between them.

STS 24 stores data unaltered for N sample periods while MTS 20 accumulates and drops one data sample each period. Thus, the STS 24 contents are delayed relative to the MTS 20 contents, the amount of the delay being equal to the number of sample periods since the previous transfer pulse. STS 24 can introduce delays from 0 to N−1 samples periods.

Bit-wise comparison of the outputs of STS 24 and MTS 20 using exclusive-or gate 64 and gating the exclusive or output with the shift clock in gate 66 yield an output of pulses whose density is a function of the correlation of the high frequency signal replicas of the outputs of STS 24 and MTS 20.

POWER CONSUMPTION

One of the objects of the present invention was to produce a time compression correlator suitable for battery operated or power-limited ordnance devices. C-MOS shift registers were selected since these devices dissipate less power than other logic families. However, the power dissipation of a C-MOS shift register is directly proportional to its shift frequency.

The use of a GCA design as opposed to a more conventional design without a gated clock accumulator reduces power consumption significantly. As an illustration of this point, compare this invention with a correlator using a second moving time series (MTS 2) in place of the GCA. This more conventional design would include a first moving time series (MTS 1) a second moving time series (MTS 2) and a stationary time series (STS).

Figure 1:
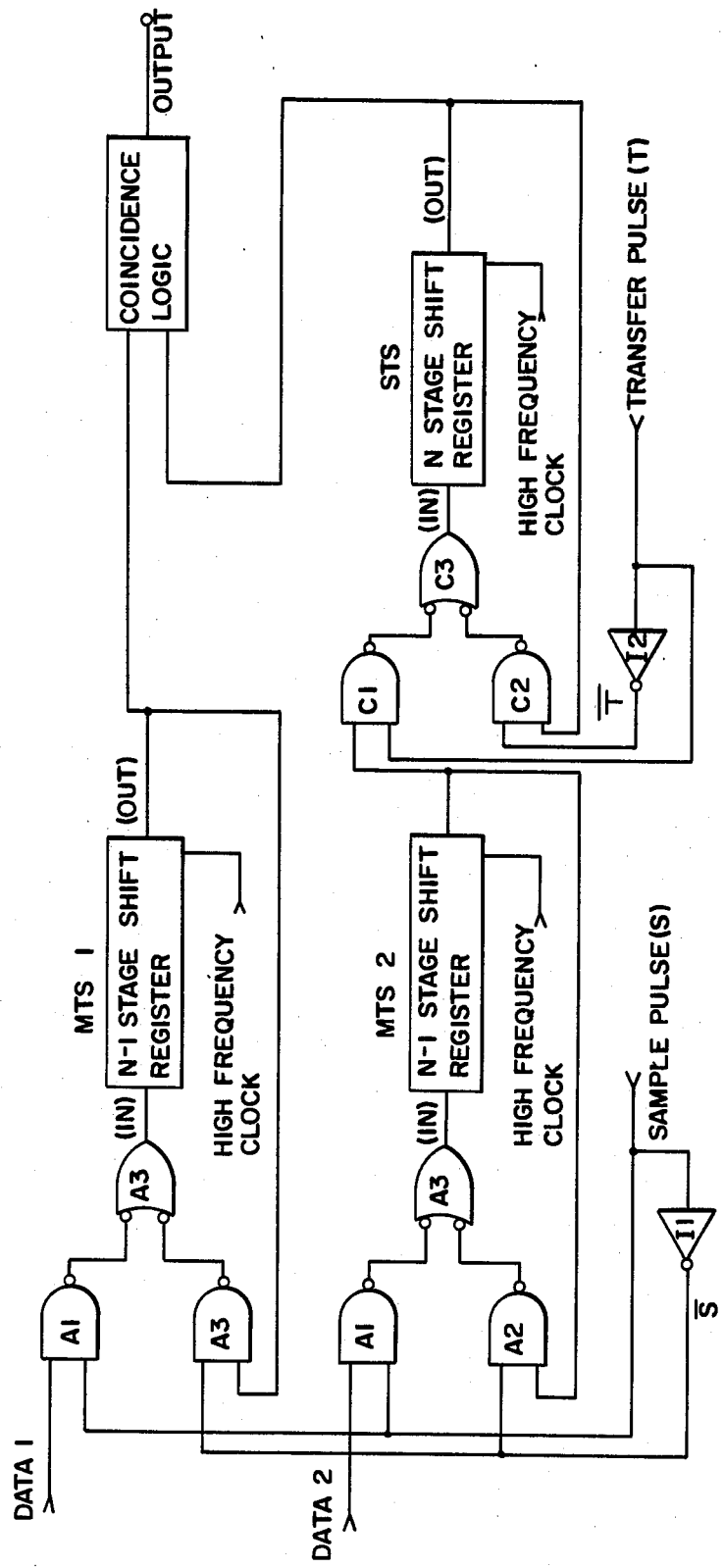
FIG. 1 is a schematic diagram of a time compression correlator of conventional design.

Referring back to FIG. 1, compare the conventional design correlator with that of the correlator according to the present invention. MTS 1, STS, and the coincidence logic are identical for both circuits. However, MTS 2 is a recirculating, high clock rate shift register; MTS 2 shifts data at N times fs at all times. The gated clock accumulator shifts data at fs Hz for N−1 sample periods and shifts data at N times fs Hz for the Nth sample period when data are transferred to the STS. Since MTS 1, STS, and the coincidence logic are identical for both designs, their power dissipation is identical. Thus, the power dissipation ratio of the two circuits is proportional to the power dissipation of MTS 2 versus the gated clock accumulator.

For C-MOS shift registers, power dissipation is linearly proportional to shift frequency. Thus, the power dissipation of MTS is:

$$Pd\ MTS \propto N \times fc = N \times (N \times fs) = N^2 fs$$

where
fc = clock frequency
= N times sample frequency (fs)

The power dissipation of the gated clock accumulator is:

$$Pd\ GCA \propto (N-1) \times fs + fc = (N-1) \times fs + N \times fs = (N-1+N) \times fs = (2N-1) \times fs$$

the ratio is:

$$\frac{Pd\ GCA}{Pd\ MTS} = \frac{(2N-1) \times fs}{N^2 \times fs} = \frac{2N-1}{N^2}$$

Column A of Table 1 enumerates the power dissipation ratio of the gated clock accumulator versus the MTS for various shift register lengths. The total circuit power dissipation ratio of the time compression correlator comprising the gated clock accumulator versus the correlator comprising MTS 2 is listed in Column B. The time compression correlator employing the gated clock accumulator yields a power dissipation reduction of up to 33 percent over the previous design without any information loss.

TABLE 1

| Shift Register length n | Column A<br>Pd GCA / Pd MIS | Column B<br>Total Power Dissipation Ration |
|---|---|---|
| 4 | .438 | .813 |
| 8 | .234 | .745 |
| 16 | .121 | .707 |
| 32 | .061 | .687 |
| 64 | .031 | .677 |
| 128 | .016 | .672 |
| 256 | .008 | .669 |
| 512 | .004 | .668 |
| 1024 | .002 | .667 |

Therefore, it is apparent that there has been provided a time compression correlator suitable for use in battery powered or other power limited situations. The configuration according to the present invention dissipates less power than those of more conventional design. Furthermore, the correlator according to the present invention is a simplified design. The GCA does not require recirculation logic as does the MTS. In multiple time compression correlator applications using the previous circuit design, each shift register requires recirculation logic. For the GCA design, the clock gating logic need be implemented only once regardless of the number of correlators required.

Naturally, the GCA design can be implemented using all types of logic and the simplicity resulting from constructing one less recirculating shift register would still be obtained. However, since other logic families, such as TTL and DTL, draw little increased power with increased clock frequency, the power dissipation would not be as significant as that obtained using C-MOS devices.

Obviously, other embodiments and modifications of the present invention will readily come to those of ordinary skill in the art having the benefit of the teachings presented in the foregoing description and the drawings. It is, therefore, to be understood that this invention is not to be limited thereto and that said modifications and embodiments are intended to be included within the scope of the appended claims.

What is claimed and desired to be secured by Letters Patent of the United States is:

1. A correlator for the comparison of first and second clipped analog signals as a function of the time delay between them comprising:
   means for sampling said first clipped analog signal at predetermined intervals of time;
   means for storing said first clipped analog signal samples consecutively and generating therefrom a time compressed multi-bit replica of a predetermined length group of said first clipped analog signal samples each time a new first clipped analog signal sample is stored;
   means for sampling said second clipped analog signal at predetermined intervals of time;
   means for storing said second clipped analog signal samples consecutively in groups of predetermined length and generating therefrom a multi-bit replica of each of said groups of said second clipped analog signal samples;
   means for generating a time compressed multi-bit replica of each of said groups of said second clipped analog signal samples;

means for comparison of said time compressed multi-bit replicas of each of said groups of said clipped analog signal samples with said time compressed multi-bit replicas of each of said groups of first clipped analog signal samples; and means for generating in response to said comparison a set of pulses, the density of said pulses being proportional to the degree of coincidence between said first and second clipped analog signals.

2. The correlator of claim 1 wherein said means for storing said first clipped analog signal samples consecutively and generating therefrom a time compressed multi-bit replica of a predetermined length group of said first clipped analog signal samples is a moving time series shift register wired in recirculation fashion.

3. The correlator of claim 1 wherein said means for generating a time compressed multi-bit replica of each of said groups of said second clipped analog signal samples is a stationary time series shift register wired in recirculation fashion.

4. The correlator of claim 1 wherein said means for storing said second clipped analog signal samples consecutively in groups of predetermined length and generating therefrom a multi-bit replica of each of said groups of said second analog signal samples is a gated clock accumulator.

5. A correlator for the comparison of first and second clipped analog signals as a function of the time delay between them comprising:
- a moving time series;
- sampling and recirculation logic coupling said first clipped analog signal to said moving time series;
- a gated clock accumulator coupled to said second clipped analog signal;
- clock gating logic coupled to said gated clock accumulator to properly load and recall data from said gated clock accumulator;
- a stationary time series coupled to the output of said gated clock accumulator; and
- coincidence logic coupled to the outputs of said moving time series and said stationary time series for comparing said outputs, whereby a correlator output is generated that is representative of the coincidence between said first and second clipped analog signals.

6. A correlator for the comparison of first and second clipped analog signals as a function of the time delay between them for use with an external source of timing pulses including high frequency clock pulses C having a frequency fc, a waveform period of 1/fc, and a pulse width of 1/fc; sample pulses S having a waveform period of N/fc, and a pulse width of 1/fc, and transfer pulses having waveform period of N(N×1/fc) and a pulse width of N/fc comprising:
- a first shift register having N−1 stages, a clock input coupled to said external source of high frequency clock pulses, a data input port and a data output port;
- sampling and recirculation logic coupled to said external source of sample pulses, gating said first clipped analog signal into said data input port of said first shift register, and recirculating data from said output port of said first shift register back to said input port of said first shift register, whereby data at said output port of said first shift register is gated back to said input port of said first shift register only when the complement of a sample pulse is present and whereby new data from said first clipped analog signal can appear at said data input port of said first shift register only in the presence of a sample pulse and whereby once said first shift register is filled with data, each succeeding data sample of said first clipped analog signal replaces the oldest of such data samples stored and whereby a high frequency N-bit replica of the accumulated data within said register is presented at said output of said first shift register during each sample period;
- a second shift register having N−1 stages, a clock input, a data input port, and a data output port coupled to said second clipped analog signal;
- clock gating logic coupled to said external source of transfer pulses, sample pulses, and high frequency clock pulses, having an output coupled to said clock input of said second shift register whereby data is shifted in said second shift register on transitions of the high frequency clock in the presence of a transfer pulse or on transitions of the sample pulse when not in the presence of a transfer pulse and whereby an N-bit replica of data accumulated in said register is produced at said output port of said second shift register during every Nth sample period;
- a third shift register having N stages, a clock input coupled to said external source of high frequency clock pulses, a data input port and a data output port;
- stationary time series recirculation logic coupled and responsive to said external source of transfer pulses and gating said output port of said second shift register to said input port of said third shift register and gating said output port of said third shift register back to said input port of said third shift register whereby data appearing at said output port of said third shift register will be a high frequency N-bit replica of data stored in said third shift register and transferred from said output of said second shift register; and
- coincidence logic coupled to said outputs of said first shift register and said third shift register whereby the data at said respective outputs are compared bit by bit and whereby a correlator output is generated that is proportional to the degree of coincidence between said first and second clipped analog signals.

* * * * *